(12) United States Patent
Dennison et al.

(10) Patent No.: US 7,184,157 B2
(45) Date of Patent: Feb. 27, 2007

(54) METHOD, APPARATUS AND PROGRAM PRODUCT PROVIDING FOR MULTIPLE PRINT JOB TICKETS PER PRINT JOB SOURCE FILE

(75) Inventors: Carl Michael Dennison, Longmont, CO (US); Ronald L. Heiney, Longmont, CO (US); Brian William Moroney, Longmont, CO (US); Dwight Ross Palmer, Longmont, CO (US); Adam A. Swartz, Thornton, CO (US); Garrett L. Thompson, Longmont, CO (US); John Stuart Walker, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/065,528

(22) Filed: Oct. 26, 2002

(65) Prior Publication Data

US 2003/0090708 A1    May 15, 2003

Related U.S. Application Data

(60) Provisional application No. 60/348,474, filed on Oct. 26, 2001.

(51) Int. Cl.
G06F 3/12 (2006.01)
G06F 17/24 (2006.01)

(52) U.S. Cl. .................. 358/1.15; 358/1.12; 358/1.13; 715/522; 715/523; 715/530

(58) Field of Classification Search .............. 358/1.13, 358/1.15; 395/117
See application file for complete search history.

(56) References Cited

U.S. PATENT DOCUMENTS

| | | | |
|---|---|---|---|
| 5,243,381 A | 9/1993 | Hube | 355/204 |
| 5,600,762 A | 2/1997 | Salgado et al. | 395/114 |
| 5,781,711 A | 7/1998 | Austin et al. | 395/114 |
| 5,923,013 A * | 7/1999 | Suzuki et al. | 235/375 |
| 5,995,721 A | 11/1999 | Rourke et al. | 395/114 |
| 6,173,295 B1 | 1/2001 | Goertz et al. | 707/505 |
| 6,236,463 B1 | 5/2001 | Cyman et al. | 358/1.14 |
| 6,509,974 B1 * | 1/2003 | Hansen | 358/1.12 |
| 2002/0080402 A1 * | 6/2002 | Robinson et al. | 358/1.15 |

* cited by examiner

*Primary Examiner*—Kimberly Williams
*Assistant Examiner*—Peter K. Huntsinger
(74) *Attorney, Agent, or Firm*—David W. Victor; Konrad Raynes & Victor LLP

(57) ABSTRACT

A print job is preferably displayed using a visual job ticketing application. An operator is enabled to create multiple job tickets describing print parameters to be applied to the print job. Using the visual job ticketing application, the operator may select a previously created job ticket to be used to display and/or print the print job. Alterations made to the print job are automatically propagated across all associated print job tickets. When creating new print job tickets, the operator may choose to start with a blank job ticket, a default job ticket, the last active job ticket or any previously created job ticket.

31 Claims, 6 Drawing Sheets

| Copy Exceptions | | | |
|---|---|---|---|
| The document that you are copying pages from contain page exceptions shown at the right. | Page(s) | Type | Exceptions |
| | 1 - 6 | Subst. | Green |
| | 7 - 12 | Subst. | Canary |
| Do you wish to copy these exceptions along with the pages? | 13 - 18 | Subst. | Blue |
| Press one of the buttons below to indicate your choice. | | | |
| Copy page exceptions | | | |
| Do not copy page exceptions | | | |

*Fig. 5*

METHOD, APPARATUS AND PROGRAM PRODUCT PROVIDING FOR MULTIPLE PRINT JOB TICKETS PER PRINT JOB SOURCE FILE

CROSS REFERENCE TO RELATED APPLICATIONS

This application claims priority from Provisional Application Ser. No. 60/348,474 filed Oct. 26, 2001.

BACKGROUND OF INVENTION

The present invention relates to the field of printing using modern, high-function printers. More specifically, the invention relates to print job ticketing, wherein print parameters applying to a source file are specified in a so-called job ticket, and the ability to associate more than one print job ticket with a source file.

At the outset, it is useful to review certain terminology which will be used in the following discussion. A print job typically is a data file stored accessibly to an information handling system such as a high function personal computer or network server. The data file may have been originated in a number of ways known to printing technologists, including original document keying, scanning, the use of graphics design programs, and the like. The print job may be understood as defining a sequence of pages, each page including content to be printed.

In preparing a print job for transfer to a high-feature printer, such as the IBM Infoprint 2000 and others, an operator will create a job ticket which describes to the printer or print server the control functions necessary to cause the print job to appear on the printed pages as desired by the originator. The operator may specify many different job ticketing parameters such as choice of media, ordered media sets (such as precut tab stock), one-sided or two-sided printing, force-to-front-side printing, preprinted inserts, document covers, tape binding, stapling, hole drilling, and so on. Some of these parameters may apply to the entire document described by the print job (document attributes) while others apply only to certain pages within the document (page exceptions). Many of these parameters are best perceived visually.

Typically, existing products require that the job originator specify these parameters using traditional dialogs and selecting the page numbers for page exceptions. In such an environment, it is easy for the job originator to make a mistake because there is no visual feedback identifying exactly what document attributes were set or which pages have exceptions. Some existing products use a proprietary document viewing application to show a visual image of each page in the document with some visual indications of the current document attributes and page exceptions. Techniques allowing a user to view a document being prepared for printing, including visual cues indicating the selected print characteristics, and to modify the displayed print characteristics and thus the associated job ticket may be referred to as "visual job ticketing".

It is a common occurrence for a user to need to print the same source file in multiple ways. For example, a customer might request 90 copies of a file be printed on inexpensive standard stock and 10 copies to be printed on higher quality stock. Existing job ticketing solutions, including those known visual job ticketing solutions, have a one-to-one mapping between source file and job ticket, thus requiring the operator to make multiple copies of the source file, one for each different job ticket. Multiple copies require more storage space, increase the likelihood of a ticketing or printing error and increase the job-ticket management demands imposed on the operator and on the system resources. This requirement seems especially burdensome since, in most situations, the majority of the print parameters will be the same from one job ticket to the next, varying only in a few key aspects.

Therefore it is desirable to allow multiple job tickets to be created and associated with a single print job source file. It is also desirable to provide a simple, intuitive way of creating and managing these print job tickets, preferably utilizing visual job ticketing. Finally, it is desirable to allow the creation of new print job tickets using an existing print job ticket as a starting point and making only those changes that are necessary.

SUMMARY OF INVENTION

The present invention contemplates supporting multiple job tickets for a single source file, such as a .pdf file or a file created using any other page description language. This allows a user to provide a single print job source file and request that it be produced (printed) in multiple ways. For example, a customer may require simplex transparencies of a presentation along with duplex, plain paper handouts. Or, a user may simply require the job be printed on two different kinds of paper. Each variation of user intent can be defined and saved as a unique job ticket. A job ticket management application according to the present invention remains aware of the multiple job tickets, maintains the relationship between the job tickets and the applicable print job source file and propagates behavior across the various job tickets as appropriate.

When the operator is ticketing the file (defining the desired print parameters), preferably utilizing a visual job ticketing application, there is a single job ticket that can be thought of as the "active" ticket. This job ticket determines the visual presentation of the pending print job (including visual clues indicating selected print characteristics such as paper, color, duplex, etc.) and how the job will be produced if submitted for printing. If an operator wishes to create an additional print job ticket, a "New Ticket" function is selected. This will result in the loading of a new, default job ticket, the establishment of the new job ticket as the active ticket and the creation of a new visual presentation of the print job consistent with the selected print parameters of the new, now-active job ticket. Preferably, when creating a new job ticket, the operator may choose between starting with a blank job ticket, some defined default job ticket or the print parameters of the last job ticket accessed. The operator may then add/change attributes in the new job ticket as desired. The operator can switch between tickets using an interface similar to traditional window-switching applications, e.g., Select Ticket" which will display all available job tickets and allow the operator to select a specific ticket to make it active.

The invention provides for simple and intuitive management of multiple tickets. Given the one-to-many source to ticket relationship and the desire to simplify the demands made on the operator for managing print parameters across tickets, the invention provides for a number of ticket management functions which will be discussed below. The present invention reduces demands on the print system resources by allowing an operator to specify multiple ways of producing a print job while maintaining only one copy of the print job source file. The present invention also reduces job ticket errors and increases job ticketing speed because it allows the creation of new job tickets by using an existing job ticket as a starting point.

BRIEF DESCRIPTION OF DRAWINGS

Some of the purposes of the invention having been stated, others will appear as the description proceeds, when taken in connection with the accompanying drawings, in which:

FIG. 5 is a depiction of an import page dialog box of an embodiment of the present invention.

DETAILED DESCRIPTION

While the present invention will be described more fully hereinafter with reference to the accompanying drawings, in which a preferred embodiment of the present invention is shown, it is to be understood at the outset of the description that follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
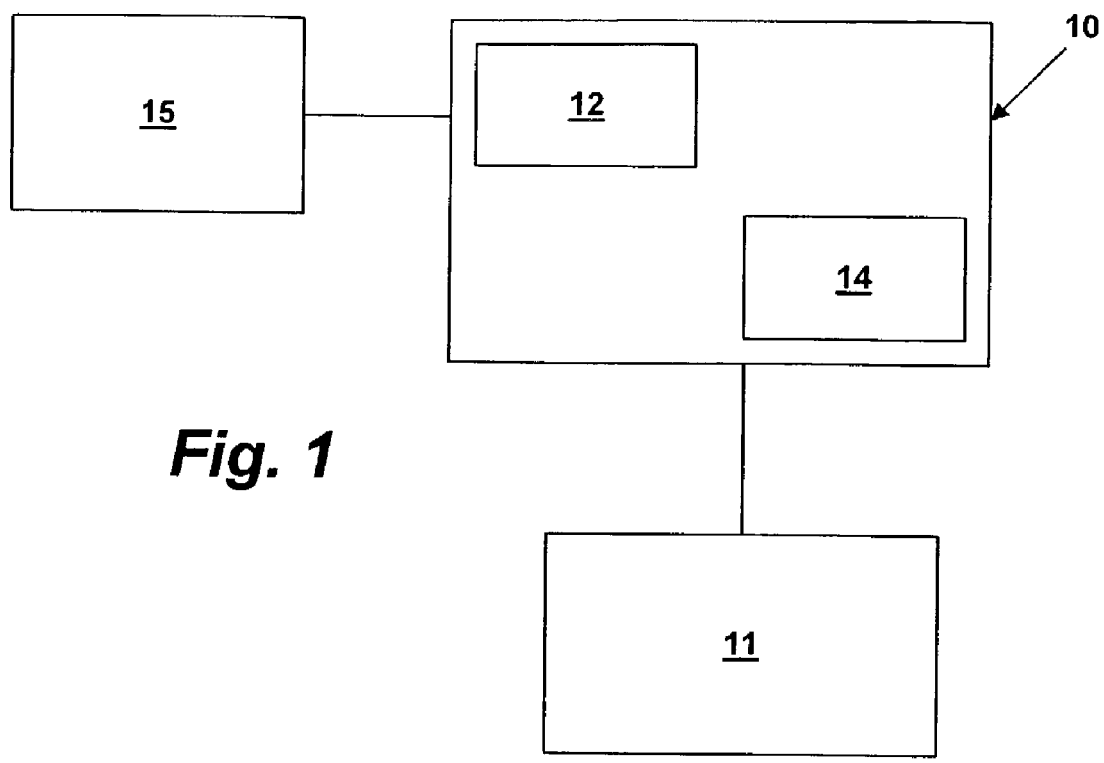
FIG. 1 is a schematic representation of an information handling system and associated printer in which the present invention is implemented.

Referring now to FIG. 1, an information handling system implementing the present invention is there shown at 10 with an associated high feature printer 11. The system 10 has a processor 12, associated memory 14, and a display 15. Appropriate operator manipulated input devices such as a keyboard or pointing device are provided as well known in the appropriate arts, but are not illustrated as being well known. By using the input devices, an operator may cause the system 10 to retrieve and execute programs and operate on data files which may be stored in the memory 14 or otherwise be accessible to the processor 12 as through a network, from a removable disk or the like.

Figure 2:
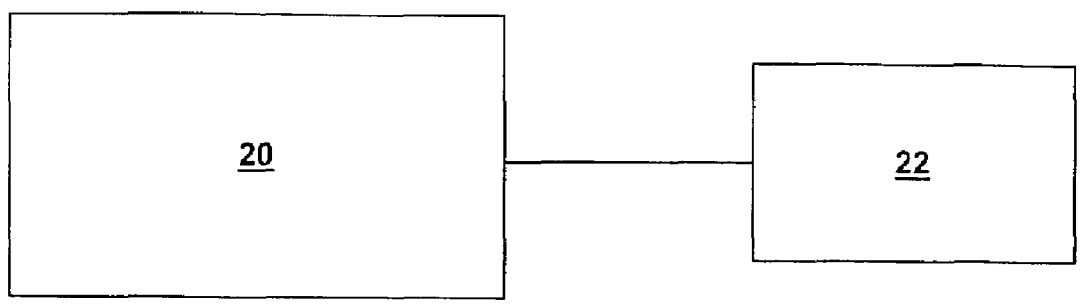
FIG. 2 is a block diagram illustrating the traditional one-to-one relationship between a print job ticket and a print job source file.

FIG. 2 illustrates the traditional one-to-one relationship between a print source file 20 and a print job ticket 22. Print job ticket 22 has been created to describe the print parameters to be associated with source file 20 when source file 20 is submitted to the printer 11 for printing. Source file 20 and job ticket 22 may be stored in memory 14, in a memory (not shown) located in the printer 11, on some removable storage media (not shown) accessible to the information handling system 10 or in any other location accessible to the information handling system 10 such as over a network (not shown), etc. Preferably, print job ticket 22 has been created using a visual job ticketing application. The initial creation of such a print job ticket using such an application is known to those of reasonable skill in the appropriate arts and is thus beyond the scope of the present invention.

Figure 3:
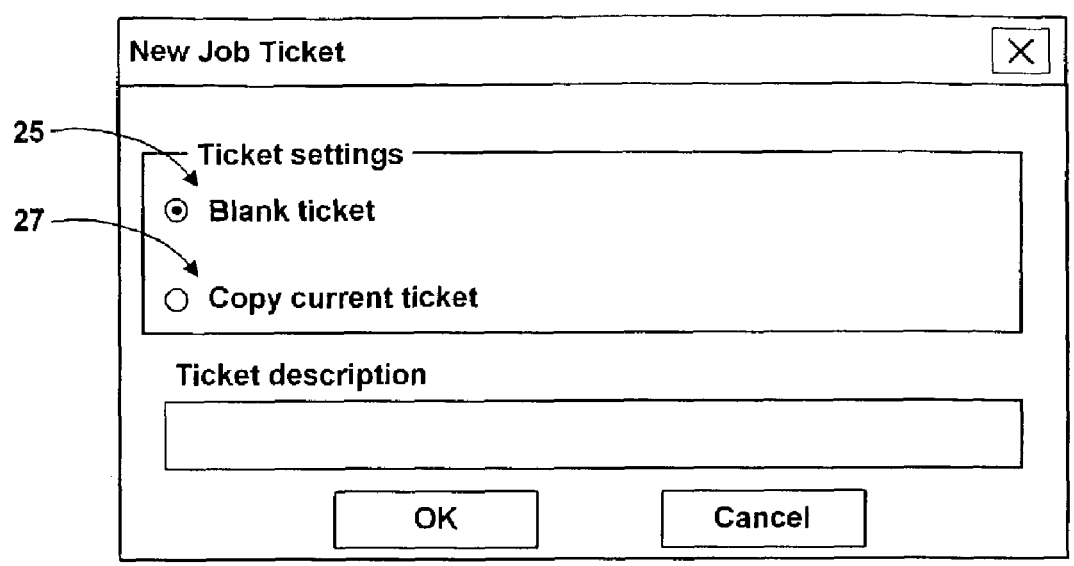
FIG. 3 is a depiction of a new ticket dialog box of an embodiment of the present invention.

When operating according to the present invention, information handling system 10 allows the operator to create new, additional print job tickets to be associated with print job source file 20. While viewing print job 20 on display 15 using, preferably, a visual ticketing application using print job ticket 22 as the active ticket, the operator may indicate a desire to create a new job ticket. FIG. 3 illustrates a dialog box which may be presented to the operator upon such an indication.

If the operator uses the dialog box represented in FIG. 3 to select the option 25 to create a new job ticket from a blank ticket, the print job is displayed via display 15 with no selected print characteristics. The operator may then select the desired print parameters as allowed by the ticketing application. As print parameters are selected, the visual ticketing application updates the display of print job 20 with visual cues indicating the selected print parameters. The option of starting with a blank job ticket is useful when the print parameters to be selected for the new job ticket are not at all similar to the print parameters of the previous job ticket.

In most instances the print parameters in a new job ticket will be largely the same as those present in the previous job ticket. In such a case, it would be preferable for the operator to select the option 27 copy current ticket. Upon such a selection, a new job ticket would be created having identical print parameters to those in the previous job ticket and the print job display would continue to reflect such selected print parameters. The operator would be afforded the opportunity to amend the print parameters through the use of the visual ticketing application. Again, as the print parameters are amended, the display of the print job 20 would be updated to reflect visual cues consistent with the amended print parameters. The new job ticket 30 could then be stored accessible to the information handling system 10 in the same manner as print job source file 20 and the previous print job ticket 22, creating the relationship shown in FIG. 4. Knowledgeable users will understand that an arbitrary number of additional job tickets could be created and stored in the same manner, all being associated with print job source file 20.

In most cases, all of the print jobs on a certain system or in a certain organization will share many of the same print parameters (font, paper size, paper type, printer id, etc.). In such an instance, it would be desirable to create a default print job ticket specifying the most common selections for each document parameter. Then, the dialog box shown in FIG. 3 could include a third choice (not shown), that of starting the new job ticket using such default print job ticket as a starting point.

Figure 4:
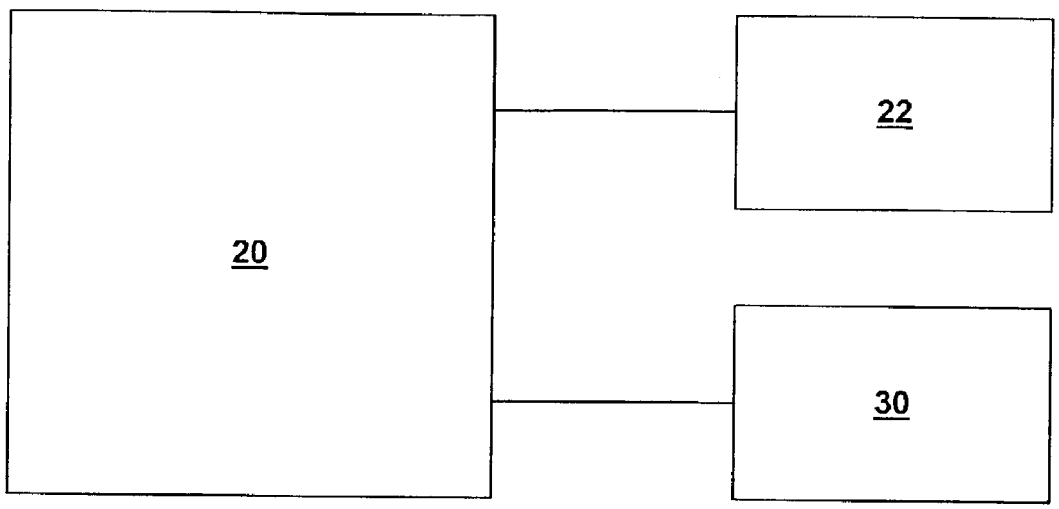
FIG. 4 is a block diagram illustrating the many-to-one relationship between print job tickets and a print job source file of the present invention.

Also, the dialog box shown in FIG. 4 could preferably include a fourth choice (not shown), that of importing the print parameters of any previously created print job ticket as a starting point for the creating of a new print job ticket. That way, if an operator knows of a pre-existing ticket with settings similar or identical to those desired in a new ticket, the operator can choose to import the existing ticket such that the attributes associated with the imported ticket are applied to the current file. The operator could then proceed with editing and storing the print job ticket as needed and as described above.

Once multiple print job tickets 22, 30 are created in association with a print job source file 20, an operator may switch between the job tickets at will. Each time such a switch is made, the information handling system 10 recognizes the change and displays the print job on display 15 with the appropriate visual cues.

In order to maintain the integrity of the multiple job tickets, an important feature of the present invention is that of tracking changes made to a print source file and propagating those changes appropriately across all job tickets associated with the source file. For example, if the operator moves a page in print job source file 20 from page position 1 to page position 5, all the print job tickets 22,30 associated with source file 20 are updated such that any print parameters associated with page 1 become associated with page 5. The present invention similarly accounts for any other print source file changes (page insertions, page deletions, page imports, etc.) across all associated print job tickets.

The following table describes the interaction between ticket operations and multiple tickets:

TABLE

| Operator Action | Action on "active" job ticket | Action on other job tickets |
|---|---|---|
| Page is deleted from print source file | Existing page references updated to reflect deleted page | Existing page references updated to reflect deleted page |
| Page(s) copied from another print source file | Pages copied (along with any ticket attributes for these pages, as defined in original file/job ticket); existing page references updated to accommodate new pages | Pages copied (along with any ticket attributes for these pages, as defined in original file/job ticket); existing page references updated to accommodate new pages |
| Add page (import page, import image) | Existing page references updated to reflect new page | Existing page references updated to reflect new page |
| Paper characteristics (color, holes, etc.) change | Paper characteristic changes | No action |
| Simplex/duplex changes | Simplex/duplex changes | No action |
| Chapter start defined | Chapter start defined | No action |
| Finishing changes | Finishing changes | No action |
| Insert added | Insert added | No action |
| Number of copies defined | Number of copies defined | No action |
| Page range defined | Page range defined | No action |
| Collated/non-collated | Collated/non-collated | No action |
| Covers defined | Covers defined | No action |

As mentioned in the table above, there are times when it is desirable to copy pages from one print file to another such that they retain the attributes assigned to them in the source file. The present invention provides an operator the ability to choose whether the ticketed page attributes should be copied with the pages or if the pages should assume the default attributes (document attributes) of the target print file. The information handling system 10 operating according to the present invention might present such a choice via a dialog box as illustrated in FIG. 5. Once the imported pages have been inserted into the source document, the present invention ensures that the page attributes, whether imported with the pages or not, are properly propagated across all associated print job tickets.

Preferably, an information handling system operating according to the present invention maintains a record of the last active job ticket 22,30 associated with a print source file 20 and displays that job ticket when the print source file 20 is reopened. This may be done by storing information about the last active ticket in the memory of the printer via the registry, in a specific file or in the memory 14 of the information handling system 10 (FIG. 1). In the preferred embodiment of the invention, the last active ticket is stored and named in such a way that the application can easily identify the ticket that should be opened with the file. Such an implementation avoids the need to maintain a separate file, such as a .ini file, or to modify the registry or the job ticket format. Ones skilled in the art will recognize that any one of many techniques might be used to identify the job ticket that was last active in association with a specific print source file and that any one of these techniques could be used in implementing the invention without departing from the scope of the invention.

Figure 6:
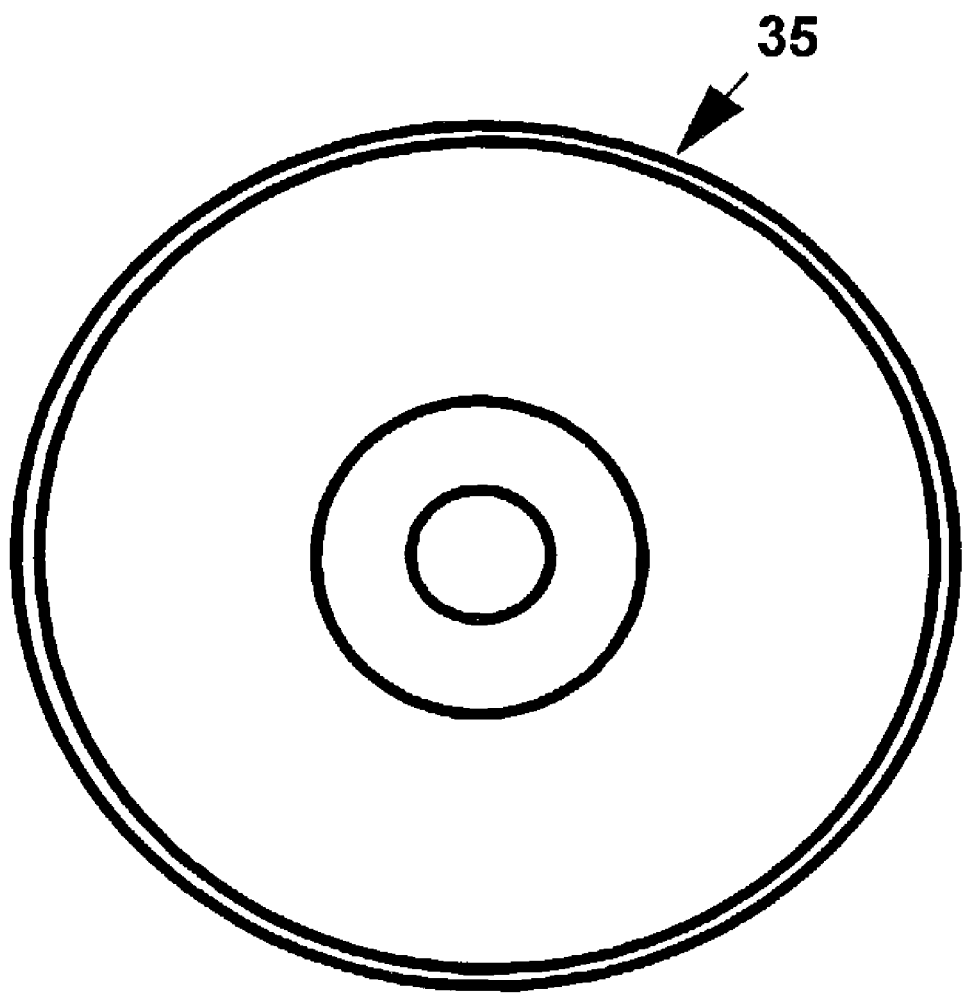
FIG. 6 is an illustration of a computer readable medium bearing program instructions effective when executing to implement the present invention.

Program instructions implementing the present invention as here described and shown may be distributed on computer readable media such as the disc 35 shown in FIG. 6 and, when executing on a processor, will provide the functionality described herein and in the following claims.

In the drawings and specifications there has been set forth a preferred embodiment of the invention and, although specific terms are used, the description thus given uses terminology in a generic and descriptive sense only and not for purposes of limitation.

The invention claimed is:

1. A method comprising the steps:
creating a first job ticket describing print instructions applicable to a first print source file;
creating at least one additional job ticket describing different print instructions applicable to the first print source file;
altering at least one page in the first print source file by importing at least one page from a second print source file into the first print source file;
receiving selection to assign a default set of print characteristics to the at least one imported page corresponding to a set of document-wide print characteristics defined in a currently active job ticket associated with the first print source file;
updating the job tickets applicable to the first print source file in response to altering at least one page in the first print source file by amending the print instructions of the first job ticket and of the at least one additional job ticket applicable to the first print source file to account for the at least one imported page; and
storing each job ticket.

2. The method according to claim 1, wherein the operation of creating at least one additional job ticket comprises creating a plurality of additional job tickets.

3. The method of claim 1, wherein the operations of creating the first job ticket and the at least one additional job ticket are performed using a visual job ticketing application.

4. The method of claim 1, further comprising:
altering the first print source file by moving, inserting or deleting at least one page in the first print source file; and
updating the job tickets by automatically amending the print instructions of the first job ticket and of the at least one additional job ticket to account for the alteration of the first print source file.

5. The method of claim 1, wherein the operation of storing each job ticket comprises storing an indication of which job ticket was last active with respect to the first print source file.

6. The method of claim 1, wherein the operation of creating at least one additional job ticket comprises:
receiving selection of one of a set of selections comprising: loading a blank job ticket as an active job ticket applicable to the first print source file; loading a selected, previously-created job ticket as the active job ticket; retaining the first job ticket as the active job ticket; and loading a default job ticket as the active job ticket; and editing the print characteristics of the active job ticket to create the at least one additional job ticket.

7. The method of claim 6, wherein the editing operation is performed using a visual ticketing application to cause the display of the first print source file using visual cues indicating the print characteristics denoted by the active job ticket, as edited.

8. The method of claim 2, wherein the operation of creating a plurality of additional job tickets comprises, for each additional job ticket:

receiving selection of one of a set of selections comprising: loading a blank job ticket as an active job ticket applicable to the first print source file; loading a selected, previously-created job ticket as the active job ticket; retaining the previous job ticket as the active job ticket; and loading a default job ticket as the active job ticket; and editing the print characteristics of the active job ticket to create the additional job ticket.

9. The method of claim 8, wherein the editing operation is performed using a visual ticketing application to cause the display of the first print source file using visual cues indicating the print characteristics denoted by the active job ticket, as edited.

10. A method, comprising:

creating a first job ticket describing print instructions applicable to a first print source file;

creating at least one additional job ticket describing different print instructions applicable to the first print source file;

altering at least one page in the first print source file by importing at least one page from a second print source file into the first print source file;

receiving selection to retain the print characteristics of the at least one imported page as defined in a job ticket associated with the second print source file;

updating the job tickets applicable to the first print source file by automatically amending the print instructions of the first job ticket and of the at least one additional job ticket applicable to the first print source file to account for the at least one imported page; and storing each job ticket.

11. Apparatus comprising:

an information handling system having a processor, memory and a display; and an end user interface program instructions stored accessibly to the information handing system and effective when executing on said processor to access a first print source file which is stored accessibly to the information handling system and which defines a document to be printed and is adapted to:

enable an operator of the information handling system to create a first job ticket describing print instructions applicable to the first print source file;

enable the operator of the information handling system to create at least one additional job ticket describing different print instructions applicable to the first print source file;

enable the operator to alter at least one page in the first print source file by importing at least one page from a second print source file into the first print source file and by choosing to assign a default set of print characteristics to the at least one imported page corresponding to a set of document-wide print characteristics defined in a currently active job ticket associated with the first print source file;

update the job tickets applicable to the first print source file in response to the operator altering at least one page in the first print source file by automatically amending the print instructions of the first job ticket and of the at least one additional job ticket appropriately to account for the at least one imported page; and store each job ticket accessibly to the information handling system.

12. The apparatus of claim 11, wherein said user interface program instructions are effective when executing on said processor to enable the operator of the information handling system to create a plurality of additional job tickets applicable to the first print source file.

13. The apparatus of claim 11, wherein said user interface program instructions are effective when executing on said processor to implement a visual ticketing application to enable the operator of the information handling system to create job tickets applicable to the first print source file.

14. The apparatus of claim 11, wherein said user interface program instructions enable the operator to alter the first print source file by moving, deleting or inserting at least one page in the first print source file, and wherein updating the job tickets comprises automatically amending the print instructions of the first job ticket and of the at least one additional job ticket to account for the alteration of the first print source file.

15. The apparatus of claim 12, wherein said user interface program instructions further enable the operator to alter the first print source file by moving, deleting or inserting at least one page in the first print source file, and wherein updating the job tickets comprises automatically amending the print instructions of the first job ticket and of the plurality of additional job tickets to account for the alteration of the first print source file.

16. The apparatus of claim 11, wherein said user interface program instructions are further adapted to store each job ticket with an indication of which job ticket was last active with respect to the first print source file.

17. The apparatus of claim 11, wherein said user interface program instructions are further adapted to:

enable the operator of the information handling system to create at least one additional job ticket by choosing one of a set of selections comprising: loading a blank job ticket as an active job ticket applicable to the first print source file; loading a selected, previously-created job ticket as the active job ticket; retaining the first job ticket as the active job ticket; and loading a default job ticket as the active job ticket; and enable the operator of the information handling system to edit the print characteristics of the active job ticket to create the at least one additional job ticket.

18. The apparatus of claim 17, wherein said user interface program instructions are further adapted to:

display the first print source file by using visual cues indicating the print characteristics denoted by the active job ticket, as edited.

19. The apparatus of claim 12 wherein said user interface program instructions enable the operator of the information handling system to create the plurality of additional job tickets by, for each additional job ticket:

choosing one of a set of selections comprising: loading a blank job ticket as an active job ticket; loading a selected, previously-created job ticket as the active job ticket; retaining the first job ticket as the active job ticket; and loading a default job ticket as the active job ticket; and editing the print characteristics of the active job ticket to create the additional job ticket.

20. The apparatus of claim 19, wherein said user interface program instructions are further adapted to display the print job source file by using visual cues indicating the print characteristics denoted by the active job ticket, as edited.

21. Apparatus comprising:
an information handling system having a processor, memory and a display; and
an end user interface program instructions stored accessibly to the information handing system and effective when executing on said processor to access a first print source file which is stored accessibly to the information handling system and which defines a document to be printed and is adapted to:
enable an operator of the information handling system to create a first job ticket describing print instructions applicable to the first print source file;
enable the operator of the information handling system to create at least one additional job ticket describing different print instructions applicable to the first print source file;
enable the operator to alter at least one page in the first print source file by importing at least one page from a second print source file into the first print source file and by choosing to retain the print of the at least one imported page as defined in a job ticket associated with the second print source file;
updating the job tickets an automatically amending the print instructions of the first job ticket and of the at least one additional job ticket to account for the at least one imported page; and
store each job ticket accessibly to the information handling system.

22. A program product comprising:
a computer readable storage medium; and
end user interface program instructions stored on said medium and adapted when executing on an information handling system to:
access a first print source file which is stored accessibly to said information handling system and which defines a document to be printed;
enable an operator of the information handling system to create a first job ticket describing print instructions applicable to the first print source file;
enable the operator of the information handling system to create at least one additional job ticket describing different print instructions applicable to the first print source file;
enable the operator to alter at least one page in the first print source file by importing from a second print source file into the first print source file and by choosing to assign a default set of print characteristics to the at least one imported page corresponding to a set of document-wide print characteristics defined in a currently active job ticket associated with the first print job;
update the job tickets applicable to the first print source file in response to altering the at least one page in the first print source file by automatically amending the print instructions of the first job ticket and of the at least one additional job ticket appropriately to account for the at least one imported page; and store each job ticket accessibly to the information handling system.

23. The product of claim 22, wherein said user interface program instructions are further adapted to enable the operator of the information handling system to create a plurality of additional job tickets applicable to the first print source file.

24. The product of claim 22 wherein said user interface program instructions are further adapted to implement a visual ticketing application to enable the operator of the information handling system to create job tickets applicable to the first print source file.

25. The product of claim 22, wherein said user interface program instructions enable the operator of the information handling system to alter the first print source file by moving, deleting at least one page in the first print source file, wherein updating the job tickets comprises automatically amending the print instructions of the first job ticket and of the at least one additional job ticket to account for the alteration of the first print source file.

26. The product of claim 22, wherein said user interface program instructions are further adapted to store each job ticket with an indication of which job ticket was last active with respect to the first print job.

27. The product of claim 22, wherein said user interface program instructions are further adapted to:
enable the operator of the information handling system to create at least one additional job ticket by choosing one of a set of selections comprising: loading a blank job ticket as an active job ticket; loading a selected, previously-created job ticket as the active job ticket; retaining the first job ticket as the active job ticket; and loading a default job ticket as the active job ticket; and
enable the operator of the information handling system to edit the print characteristics of the active job ticket to create the at least one additional job ticket.

28. The product of claim 27, wherein said user interface program instructions are further adapted to implement a visual ticketing application to display the first print source file by using visual cues indicating the print characteristics denoted by the active job ticket, as edited.

29. The product of claim 23, wherein said user interface program instructions enable the operator of the information handling system to create the plurality of additional job tickets by, for each additional job ticket:
choosing one of a set of selections comprising: loading a blank job ticket as an active job ticket; loading a selected, previously-created job ticket as the active job ticket; retaining the first job ticket as the active job ticket; and loading a default job ticket as the active job ticket; and
enable the operator of the information handling system to edit the print characteristics of the active job ticket to create the additional job ticket.

30. The product of claim 29, wherein said user interface program instructions are effective when executing on said information handling system to implement a visual ticketing application to display the first print source file using visual cues indicating the print characteristics denoted by the active job ticket, as edited.

31. A program product comprising:
a computer readable storage medium; and
end user interface program instructions stored on said medium and adapted when executing on an information handling system to:

access a first print source file which is stored accessibly to said information handling system and which defines a document to be printed;

enable an operator of the information handling system to create a first job ticket describing print instructions applicable to the first print source file;

enable the operator of the information handling system to create at least one additional job ticket describing different print instructions applicable to the first print source file;

enable the operator of the information handling system to alter at least one page in the first print source file by importing at least one page from a second print source file into the first print source job and by choosing to retain the print characteristics of the at least one imported page as defined in the job ticket associated with the second print source file;

update the job tickets applicable to the first print source file in response to altering the at least one page in the first print source file by automatically amending the print instructions of the first job ticket and of the at least one additional job ticket to account for the at least one imported page; and store each job ticket accessibly to the information handling system.

* * * * *